United States Patent
Abdallah et al.

(10) Patent No.: US 12,070,158 B2
(45) Date of Patent: Aug. 27, 2024

(54) ELECTRIC GRILL CONTROL SYSTEM

(71) Applicant: W.C. Bradley Co., Columbus, GA (US)

(72) Inventors: Sleiman Abdallah, Columbus, GA (US); William Dixon, Columbus, GA (US); Alex Gafford, Midland, GA (US); James D. Kring, Opelika, AL (US)

(73) Assignee: W.C. Bradley Co., Columbus, GA (US)

( * ) Notice: Subject to any disclaimer, the term of this patent is extended or adjusted under 35 U.S.C. 154(b) by 0 days.

(21) Appl. No.: 17/838,661

(22) Filed: Jun. 13, 2022

(65) Prior Publication Data

US 2022/0395138 A1 Dec. 15, 2022

Related U.S. Application Data

(60) Provisional application No. 63/209,574, filed on Jun. 11, 2021.

(51) Int. Cl.
*A47J 37/07* (2006.01)

(52) U.S. Cl.
CPC ....... *A47J 37/0709* (2013.01); *A47J 37/0786* (2013.01)

(58) Field of Classification Search
CPC .. A47J 37/0611; A47J 37/0629; A47J 37/067; A47J 37/0676; A47J 37/07; A47J 37/0704; A47J 37/0709; A47J 37/0763; A47J 37/0786; A47J 37/079
See application file for complete search history.

(56) References Cited

U.S. PATENT DOCUMENTS

| | | | |
|---|---|---|---|
| 3,959,620 A | 5/1976 | Stephen, Jr. | |
| 6,037,571 A * | 3/2000 | Christopher | A47J 37/0709 219/482 |
| 7,342,202 B2 * | 3/2008 | Bachinski | A47J 37/0709 219/486 |
| 8,399,810 B2 | 3/2013 | Ahmed | |
| 9,095,006 B2 * | 7/2015 | Yue | H05B 3/20 |
| 10,524,312 B2 | 12/2019 | Knappenberger et al. | |

(Continued)

FOREIGN PATENT DOCUMENTS

| | | |
|---|---|---|
| CN | 108808621 A | 11/2018 |
| EP | 3644811 | 5/2020 |
| KR | 10-1373610 B1 * | 3/2014 |

OTHER PUBLICATIONS

Weber, "Pulse Owner's Manual", 2018, Publisher: https://www.weber.com/cms-remote-assets/Service/manuals/en/59587_10018_web.pdf?mtime=2018121032550.

(Continued)

*Primary Examiner* — Hung D Nguyen
(74) *Attorney, Agent, or Firm* — GableGotwals; David G. Woodral (57) ABSTRACT

An electric cooking grill includes a firebox having a first and second heating elements, first and second cooking surfaces positioned over the first and second heating elements respectively, a household power connection, and a power dividing circuit that apportions power from the household power connection to one or both of the first and second heating elements. At least of the first and second heating elements receives up to 100% of the power from the household power connection.

7 Claims, 6 Drawing Sheets

(56) References Cited

U.S. PATENT DOCUMENTS

| | | |
|---|---|---|
| 10,537,199 B2 | 1/2020 | Knappenberger et al. |
| 10,568,460 B2 | 2/2020 | Li et al. |
| 11,454,677 B2* | 9/2022 | Knappenberger ... H05B 1/0261 |
| 2006/0191895 A1* | 8/2006 | Li ........................ A47J 37/0676 |
| | | 219/497 |
| 2012/0305545 A1* | 12/2012 | Brosnan ................ H05B 6/065 |
| | | 219/622 |
| 2017/0020334 A1* | 1/2017 | Sorenson ............ A47J 37/0709 |

OTHER PUBLICATIONS

PCT International Search Report and Written Opinion of the ISA, PCT/US22/33215; Published Oct. 26, 2022; W.C. Bradley Co.

* cited by examiner

ELECTRIC GRILL CONTROL SYSTEM

CROSS-REFERENCE TO RELATED CASES

This application claims the benefit of U.S. provisional patent application Ser. No. 63/209,574, filed on Jun. 11, 2021, and incorporates such provisional application by reference into this disclosure as if fully set out at this point.

FIELD OF THE INVENTION

This disclosure relates to cooking grills in general and, more specifically, to control systems and methods for electric grills.

BACKGROUND OF THE INVENTION

Electric grills for cooking food, especially outdoor electric barbeque grills, have often used resistive heating elements as shown in U.S. Pat. No. 8,399,810. From time-to-time it has been considered desirable to use two separate heating elements in such grills as shown in U.S. Pat. No. 3,959,620. Dual elements can be used to provide different thermal effects in different areas of the grill. Operating at a low cooking temperature in one area of the cooking grate and a high cooking temperature in another area becomes possible. Cooking a single item at different rates depending on the cooking cycle, or cooking different food items requiring different cooking temperatures for optimum results on the same grate is also possible. Additionally, one section of the grill can be designed to be used for a special function, such as providing flavor enhancing smoke from various wood-based materials, which might require a different temperature from a main cooking area.

Independent control of cooking elements may be deployed for different areas of the grill. For example, there may be two identical heating elements, each rated for 50% of the maximum power available from the circuit. Power to each element may be routed through a solid-state relay or such device to cycle the power on and off at intervals determined to establish or maintain a certain average temperature. AC power wave forms may be manipulated to provide 50% of the maximum power available from the circuit, $P_{max}$, or some reduced amount of power, to each heating element as required. An example of this is described in U.S. Pat. Nos. 10,524,312 and 10,537,199.

In the approaches described, the prior art lacks an ability to provide for more than 50% of $P_{max}$ to either of two elements. What is needed is a system and method for addressing this and other shortcomings.

SUMMARY OF THE INVENTION

The invention of the present disclosure, in one aspect thereof, comprises a system for powering multiple heating elements in an electric grill. The system includes an electrical divider that accepts household alternating current and apportions power from the alternating current to a plurality of solid-state devices, and a plurality of heating elements, each operatively connected to one of the plurality of solid-state devices. The solid-state components are operative to use switching to pass or attenuate power from the electrical divider to the associated respective heating element. Each of the plurality of heating elements may receive up to full power available from the household alternating current.

In some embodiments, the solid-state devices provide switching to pass between 0% and 100% of power received from the electrical divider onward to the respective operatively connected heating element. In some instances, the electrical divider includes a single thyristor.

The invention of the present disclosure, in another aspect thereof, comprises an electric cooking grill. The grill has a firebox having a first and second heating elements, first and second cooking surfaces positioned over the first and second heating elements respectively, and an electrical power divider that accepts household alternating current and apportions power from the alternating current to the first and second heating elements. At least one of the first and second heating elements can receive up to 100% of available power from the household alternating current to the grill.

In some embodiments, both of the first and second heating elements can receive up to 100% of available power from the household alternating current to the grill. The electrical power divider may comprise a thyristor. The grill may further comprise first and second solid state switches interposing the thyristor and the respective first and second heating elements.

The invention of the present disclosure, in another aspect thereof, comprises an electric cooking grill having a firebox having a first and second heating elements, first and second cooking surfaces positioned over the first and second heating elements respectively, a household power connection, and a power dividing circuit that apportions power from the household power connection to one or both of the first and second heating elements. At least of the first and second heating elements receives up to 100% of the power from the household power connection.

In some embodiments, the power dividing circuit comprises a rectifier and a first and second solid state metal oxide semiconductor field effect transistors (MOSFETs) configured to pass or attenuate power from the rectifier to the respective first and second heating elements. In some cases, both of the first and second heating elements receive up to 100% of the power available from the household power connection.

In other embodiment, the power dividing circuit comprises a first pair of MOSFETs interposing the household power connection and the first heating element. In such cases, the first heating element receives up to 100% of the power available from the household power connection. The power dividing circuit may further comprise a second pair of MOSFETs interposing the household power connection and the second heating element. In such cases, the second heating element receives up to 100% of the power available from the household power connection.

The invention of the present disclosure, in another aspect thereof, comprises an electric cooking grill having a fire box having first and second resistive heating elements, an electrical connection to a household power supply, and a control circuit interposing the electrical connection to the household power supply and the first and second resistive heating elements. The control circuit apportions between zero and 100% of the power from the household power supply to the first resistive heating element. The control circuit also apportions between zero and 100% of the power from the household power supply to the second resistive heating element.

In some embodiments, the control circuit comprises a thyristor that divides electric power from the household power supply between the first and second resistive heating elements.

In further embodiments, the control circuit comprises a rectifier and first and second solid state switches interposing the rectifier and the first and second resistive heating elements respectively. The first and second solid state switches may comprise metal oxide semiconductor field effect transistors (MOSFETs).

In other embodiments the control circuit comprises first and second pairs of solid-state switches interposing the electrical connection to the household power supply and the first and second resistive heating elements, respectively. In such cases, the first and second pairs of solid-state switches may comprise first and second pairs of MOSFETs.

DETAILED DESCRIPTION OF THE PREFERRED EMBODIMENTS

Figure 1:
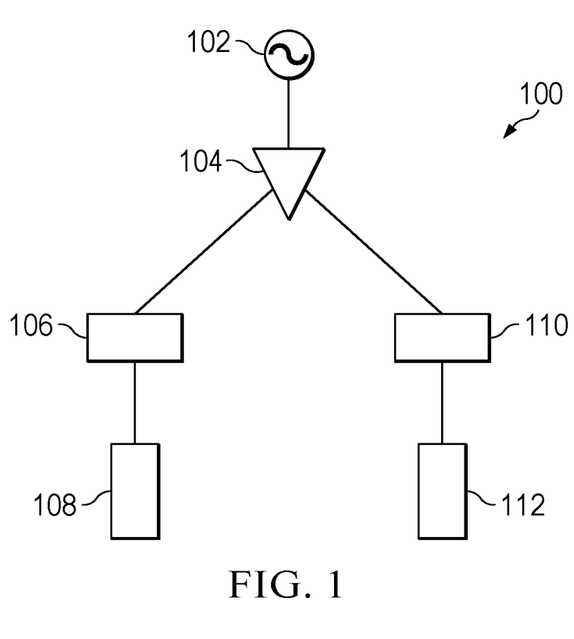
FIG. 1 is a simplified schematic diagram illustrating a circuit for operation of grill heating elements according to aspects of the present disclosure.

Referring now to FIG. 1, a simplified schematic diagram illustrating a circuit 100 for operation of grill heating elements is shown. The system operates on typical household power represented as alternating current ("AC") mains power 102, as from a household electrical circuit. An electrical divider 104, may manipulate the AC power using known techniques and operations to allocate power between a solid-state component 106 operatively connected to heating element 108 and a second solid state component 110 operatively connected to a second heating element 112.

In some embodiments, the electrical divider 104 comprises one or more triacs or thyristors. The solid-state components 106, 110 may be manufactured according to known methods and may comprise transistors such as metal oxide semiconductor field-effect transistors ("MOSFETS") that are capable of switching voltage to a load on and off based on electrical inputs without moving parts. The heating elements 108, 112 may be resistive heating elements constructed according to known methods, or may be other types of known heating elements.

According to the present disclosure, various embodiments of the power control system 100 is useful for powering the two heating elements 108, 112 using the electrical divider 104 to manipulate the AC wave form from the AC mains 102 to shift the maximum power available from the AC mains 102 to one element only (e.g., 108 or 112), or to provide some proportion of that maximum power to another element (108 or 112). Some manipulation of AC wave forms (i.e., household power) is known in the art.

According to embodiments of the present embodiment, power going to each element 108, 112 is first routed through the associated solid-state component (106, 110, respectively) or similar device to provide on and off cycling at a desired interval in response to a fixed power setting or a thermostatic control.

Using only a single electrical divider 104 to control and manipulate the AC wave form reduces the cost and complexity of the system. Further, solid state components or similar devices are highly reliable and relatively inexpensive. In one embodiment, where a second element is used to produce smoke to flavor food cooked using the first element 108, the electrical divider 104 can be set to manipulate the AC wave form to provide 100% of $P_{max}$ to the first element 108, or 95%, 90%, 85% of $P_{max}$ or some other value of percentage to the first element 108 and 5% or 10% or 15% of $P_{max}$ or some other complementary value to the second element 112. In such cases it may not be necessary to have a solid-state component or such device to provide on and off control of heating of the second element and so the system is further simplified.

In the more general cases, where, for example, there are two equal cooking areas served by equal sized cooking elements, a control system according to the present disclosure may apportion 50% of $P_{max}$ to the first element 108 and 50% of $P_{max}$ to the second element 112 using AC wave form manipulation, and then use the solid state component 106, 110 for each cooking element 108, 112 to provide all of the 50% $P_{max}$ or only some fraction based on the on/off switching cycle of the associated solid state component 106, 110. But additionally, the electrical divider 104 using AC wave form manipulation could allocate a larger fraction (e.g., up to 100% $P_{max}$) to the first element 108 using the solid state component 106 on/off cycle to regulate and control heat output, and a smaller fraction (e.g., down to 0% of $P_{max}$) to the second element 112 also using the solid state component 110 based on/off cycle to regulate and control heat. This then allows watt densities at part of the cooking area, in one case half the cooking area, to be greater than that of $P_{max}$ divided by the cooking area. Therefore, it will be seen that this control system approach provides a great deal of flexibility to implement various types of grill control with a simplified set of components.

Figure 2:
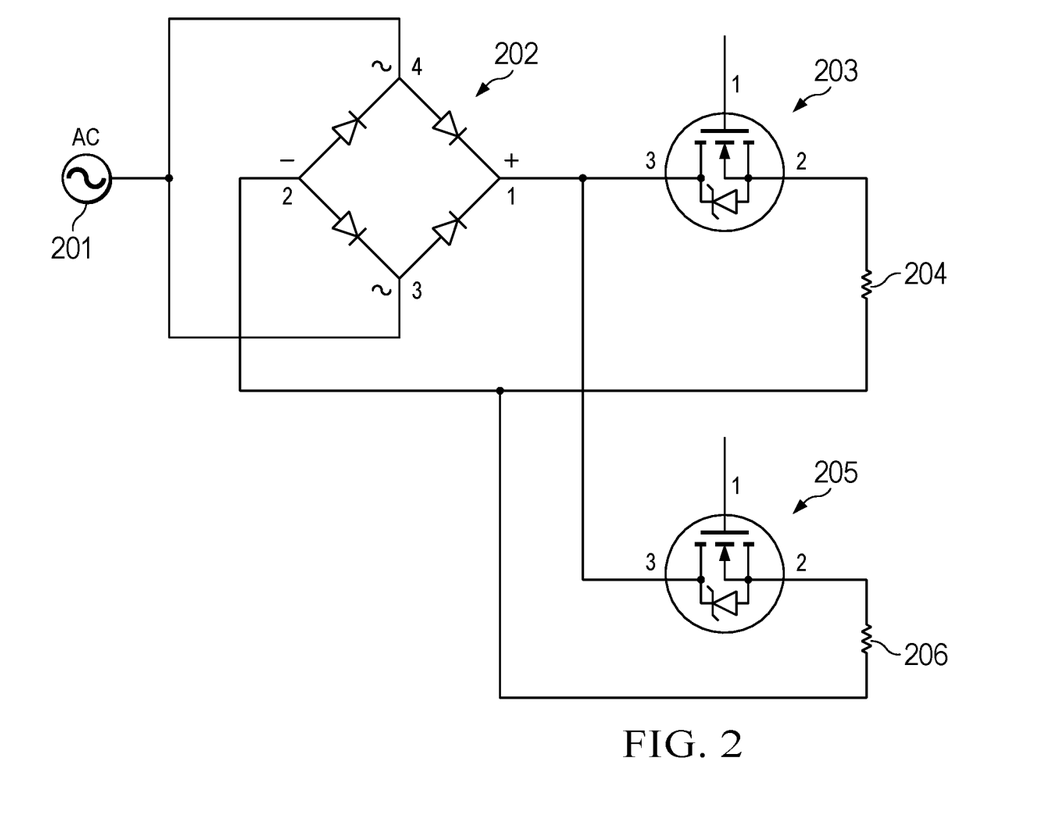
FIG. 2 is a schematic diagram illustrating a circuit for operation of grill heating elements according to aspects of the present disclosure.

Referring now to FIG. 2, a schematic diagram illustrating a circuit for operation of grill heating elements is shown. The system operates on typical household power represented as AC 201. A voltage rectifier 202, as is known in the art, may manipulate the AC power using known techniques and operations, to render fluctuating, always positive voltage to a solid state component, such as a MOSFET or other unidirectional voltage control, 203, as is known in the art, operatively connected to a heating element 204 and a second solid state component, such as a MOSFET or other unidirectional voltage control, 205, operatively connected to a heating element 206. The solid-state components 202, 203, 205 may be manufactured according to known methods. The heating elements 204, 206 may be resistive heating elements constructed according to known methods, or may be other types of known heating elements.

According to the present disclosure, various embodiments of the power control system of FIG. 2 is useful for powering the two heating elements 204, 206 using the rectifier 202 and solid state components 203, 205 to manipulate the AC wave form from the AC mains 201 to shift the maximum power available from the circuit to one element only (e.g., 204 or 206), or to provide some proportion of that maximum power to another element (204 or 206). According to embodiments of the present embodiment, power going to each element 204, 206 is first routed through the voltage rectifier 202 to the associated solid state component (203, 205, respectively) or similar device to provide on and off cycling at a desired interval in response to a fixed power setting or a thermostatic control.

Using only a single voltage rectifier with subsequent solid-state components for each respective heating element to control and manipulate the AC wave form reduces the cost and complexity of the system. Further, solid state components or similar devices are highly reliable and relatively inexpensive. In one embodiment, where a second element is used to produce smoke to flavor food cooked using the first element 204, the solid state components 203, 205 can be set to manipulate the AC wave form to provide 100% or any set percentage of $P_{max}$ to the first element 204 with the remaining percentage of $P_{max}$ provided to the second element 206.

Figure 3:
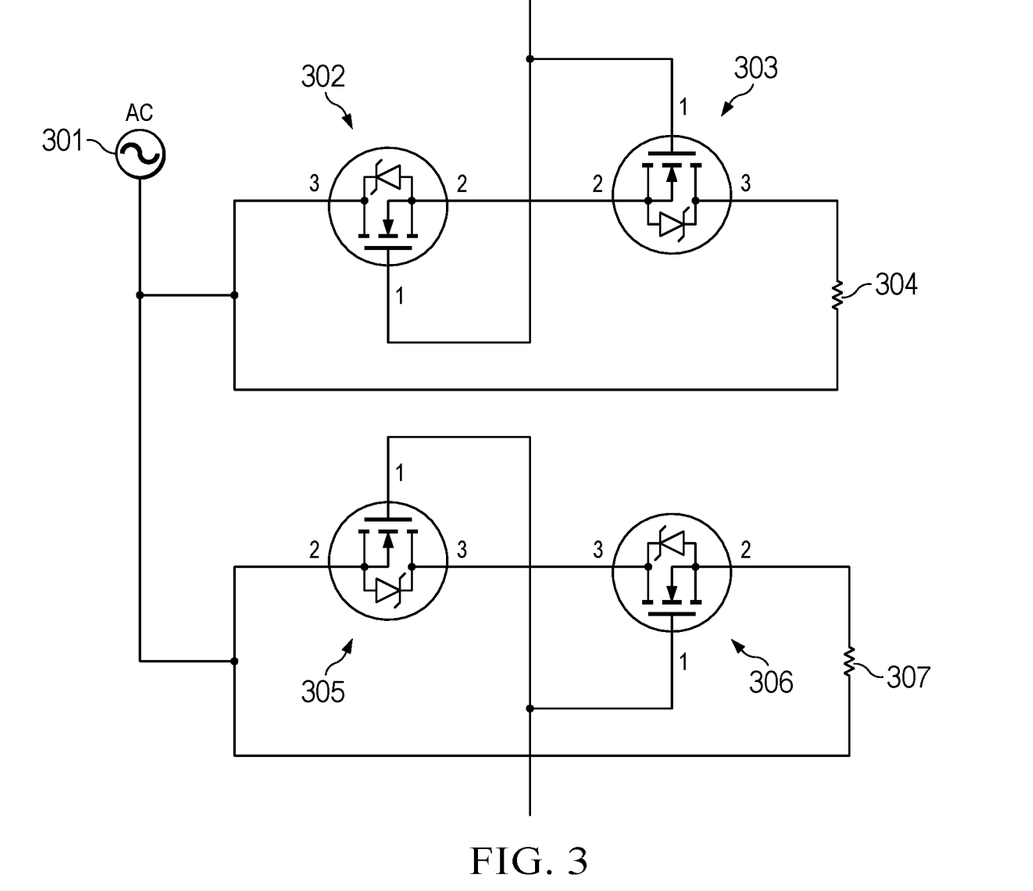
FIG. 3 is a schematic diagram illustrating a circuit for operation of grill heating elements according to aspects of the present disclosure.

Referring now to FIG. 3, a schematic diagram illustrating a circuit for operation of grill heating elements is shown. The system operates on typical household power represented as AC 301. A series of two or more solid state components, such as a MOSFET or other unidirectional voltage control, 302, 303, as is known in the art, may manipulate the AC power, to operatively control a heating element 304. A second series of two or more solid state components, such as a MOSFET or other unidirectional voltage control, 305, 306, as is known in the art, may manipulate the same AC power 301, using known techniques and operation, to operatively control a second heating element 307.

Using two solid state components for each respective heating element to control and manipulate the AC wave form reduces the cost and complexity of the system. Further, solid state components or similar devices are highly reliable and relatively inexpensive. In one embodiment, where a second element is used to produce smoke to flavor food cooked using the first element 304, the solid state components 302, 303, 305, 306 can be set to manipulate the AC wave form to provide 100% or any set percentage of $P_{max}$ to the first element 304 with the remaining percentage of $P_{max}$ provided to the second element 307.

Therefore, it will be seen that these control system approaches provide a great deal of flexibility to implement various types of grill control with a simplified set of components.

Figure 4A:
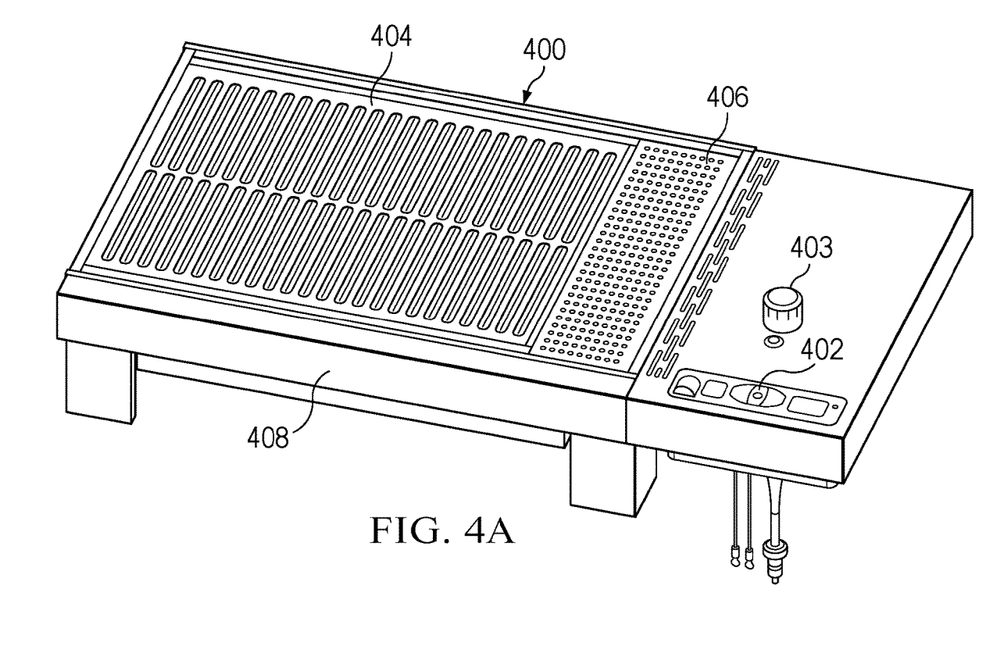
FIG. 4A is a perspective view of an electric grill cooking surface according to aspects of the present disclosure.
Figure 4B:
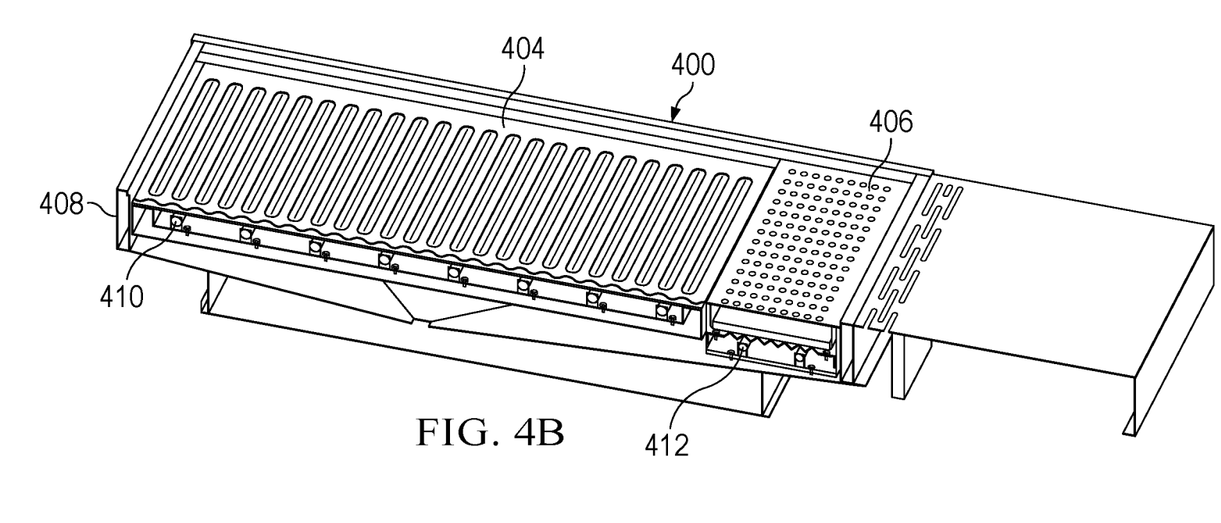
FIG. 4B is a cutaway perspective view of the electric grill cooking surface of FIG. 4B.

Referring now to FIG. 4A, a perspective view of an electric grill cooking surface 400 according to aspects of the present disclosure is shown. FIG. 4B is a cutaway perspective view of the electric grill cooking surface 400 of FIG. 4B. The cooking surface 400 may comprise one or more sections of grates, griddles, smoker boxes, and/or other implements relying on electrical power for cooking operations. As shown, a cooking grate 404 is provided alongside a smoker box 406. These may be mounted on or over a firebox 408 containing a first electric heating element 410 and a second electric heating element 412 heating the grate 404 and the smoker box 406, respectively.

Operation and control of the function of the heating elements 410, 412 can come from a variety of controls. These may include switches, sliders, rotary knobs, touch screens, and remote or wireless controls. As shown, a power switch 402 turns the heating element 412 on or off while a dial allocates 403 apportions power between the heating elements 410, 412. This may be accomplished as previously described and any portion of power from zero to maximum available mains power ($P_{max}$) may be selected for either heating element 410, 412 in some embodiments. In other embodiments, $P_{max}$ may only be available for the heating element 410 associated with the grate 404 while some lesser fraction of $P_{max}$ may be the maximum power for the smoker box 406. It should be understood though that the cooking surface 400 could comprise multiple grate sections, for example. In this case, $P_{max}$ may be available to both heating elements 410, 412 and the size and appearance of the heating elements 410, 412 and associate grate sections may differ from that shown. Various ones of the circuits described above may be implemented within, or associated with, the cooking surface 400.

Figure 5:
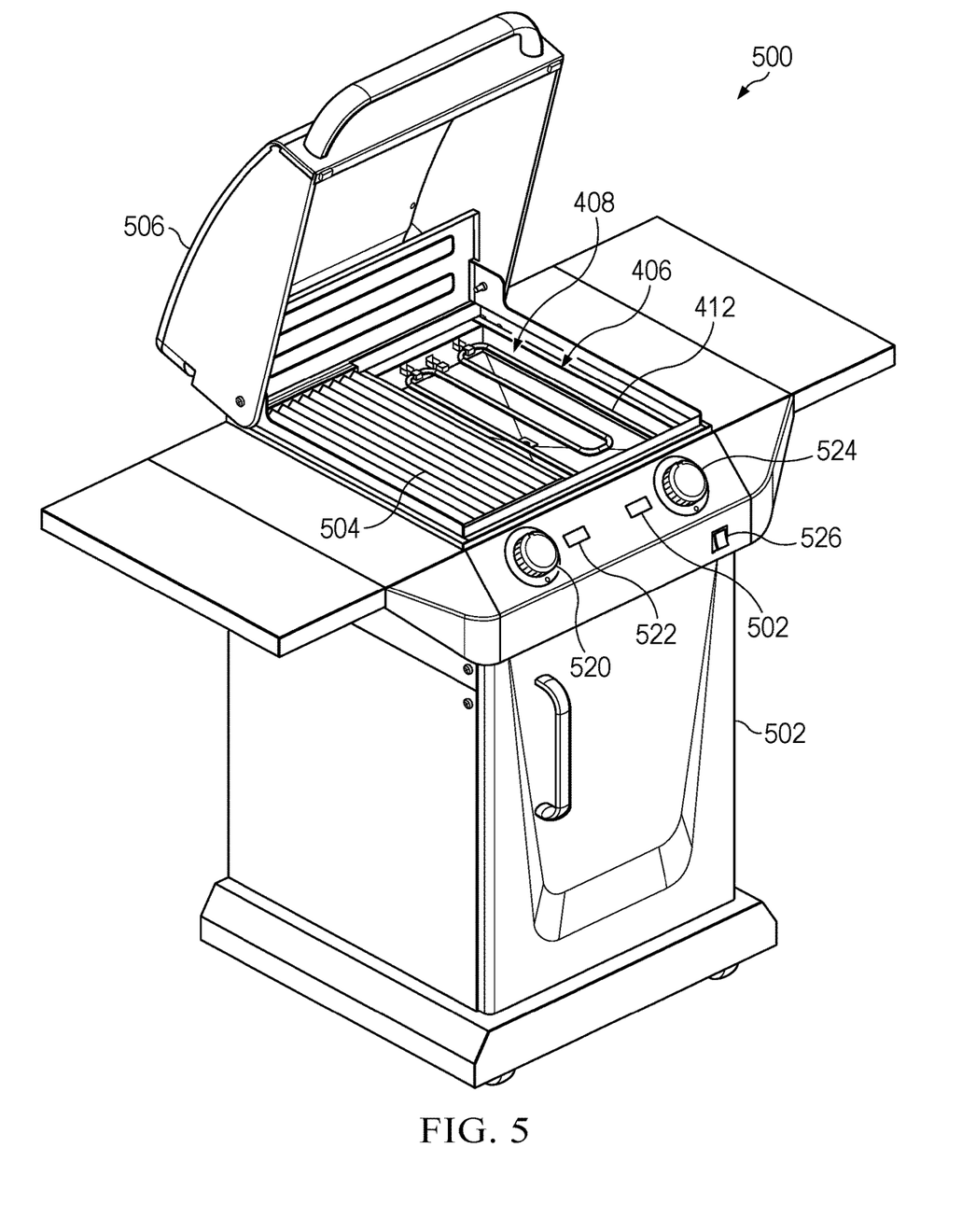
FIG. 5 is a perspective view of an electric grill according to aspects of the present disclosure.

Referring now to FIG. 5 is a perspective view of an electric grill 500 according to aspects of the present disclosure is shown. The grill 500 may comprise a cart, cabinet, or stand 502 that locates the firebox 408 at an appropriate height for ease of use. A lid 506 may selectively cover the cooking surface 400 via hinge or other open/closing mechanism.

Here the cooking surface 400 comprises two more or less equally sized cooking grates. A first grate 504 is shown on a left side of the cooking surface 400 while a second grate corresponding to a right side of the cooking surface 400 is removed to reveal the associated electric heating element 412 below. Here heating elements 410 (not shown) and 412 may have approximately the same size and rating.

A control circuit may be implemented within the grill 500 as described above to allow either or both heating elements 410, 412 to receive full $P_{max}$ power from household mains. A power switch 526 may turn the grill 500 on and off while a dial 520 controls power to heating element 410 (up to $P_{max}$ if element 412 is not powered), and a dial 524 controls power to heating element 412 (up to $P_{max}$ if element 410 is not powered). Displays 522, 524 may be associated with heating elements 410, 412, respectively. The displays 522, 524 may show the percentage of total power allocated to the respectively heating elements 410, 412, and/or temperature and other parameters.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)— (a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system for powering multiple heating elements in an electric grill comprising:
    an electrical divider comprising a thyristor that accepts household alternating current and apportions power from the alternating current to a plurality of solid-state devices; and
    a plurality of heating elements, each operatively connected to a single one of the plurality of solid-state devices;
    wherein the solid-state devices are operative to use switching to pass or attenuate power from the electrical divider to the associated respective heating element; and
    wherein each of the plurality of heating elements may receive up to full power available from the household alternating current via its operatively connected solid-state device.

2. The system of claim 1, wherein the solid-state devices provide switching to pass between 0% and 100% of power received from the electrical divider onward to the respective operatively connected heating element.

3. An electric cooking grill comprising:
    a firebox having a first and second heating elements;
    first and second cooking surfaces positioned over the first and second heating elements respectively; and
    an electrical power divider comprising a thyristor that accepts household alternating current and apportions between zero and 100% of available power from the alternating current to the first and second heating elements via first and second solid state switches, respectively;
    wherein each of the first and second solid state switches passes or attenuates power from the electrical power divider only to the respectively connected first and second heating element.

4. The electric cooking grill of claim 3, wherein both of the first and second heating elements can receive up to 100% of available power from the household alternating current to the grill.

5. An electric cooking grill comprising:
    a fire box having first and second resistive heating elements;
    an electrical connection to a household power supply; and
    an electrical power divider interposing the electrical connection to the household power supply and the first and second resistive heating elements;
    first and second solid state switches interposing the electrical power divider and the first and second resistive heating elements respectively;
    wherein the electrical power divider apportions between zero and 100% of the power from the household power supply to the first resistive heating element and first solid state switch when the first and second solid state switch are on;
    wherein the electrical power divider apportions between zero and 100% of the power from the household power supply to the second resistive heating element and second solid state switch when the first and second solid state switch are on; and
    wherein the electrical power divider comprises a thyristor.

6. The electric cooking grill of claim 5, further comprising a rectifier interposing the household power supply and the first and second resistive heating elements.

7. The electric cooking grill of claim 6, wherein the first and second solid state switches comprises metal oxide semiconductor field effect transistors (MOSFETs).

* * * * *